(12) United States Patent
Diab et al.

(10) Patent No.: US 8,533,502 B2
(45) Date of Patent: *Sep. 10, 2013

(54) SYSTEM AND METHOD FOR PHYSICAL LAYER DEVICE ENABLED POWER OVER ETHERNET PROCESSING

(71) Applicant: Broadcom Corporation, Irvine, CA (US)

(72) Inventors: Wael William Diab, San Francisco, CA (US); Scott Powell, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/652,411

(22) Filed: Oct. 15, 2012

(65) Prior Publication Data

US 2013/0036316 A1 Feb. 7, 2013

Related U.S. Application Data

(63) Continuation of application No. 12/762,435, filed on Apr. 19, 2010, now Pat. No. 8,321,695.

(51) Int. Cl.
*G06F 1/00* (2006.01)
*G06F 1/32* (2006.01)
*G06F 11/30* (2006.01)

(52) U.S. Cl.
USPC ............................. 713/300; 13/320; 13/340

(58) Field of Classification Search
USPC .................................................. 713/300
See application file for complete search history.

(56) References Cited

U.S. PATENT DOCUMENTS

| | | | |
|---|---|---|---|
| 7,353,407 B2 | 4/2008 | Diab et al. | |
| 7,445,507 B1 * | 11/2008 | Parker | 439/620.18 |
| 7,613,939 B2 | 11/2009 | Karam et al. | |
| 7,696,636 B2 * | 4/2010 | Diab | 307/1 |
| 7,756,267 B2 * | 7/2010 | Diab et al. | 379/413 |
| 7,865,754 B2 | 1/2011 | Burkland et al. | |
| 7,936,546 B2 | 5/2011 | Vorenkamp et al. | |
| 7,971,075 B2 * | 6/2011 | Diab | 713/300 |
| 8,037,324 B2 | 10/2011 | Hussain | |
| 8,044,747 B2 * | 10/2011 | Yu et al. | 333/24 R |
| 8,076,793 B2 | 12/2011 | Robbins | |
| 8,082,457 B2 | 12/2011 | Randall et al. | |
| 8,132,027 B2 * | 3/2012 | Blaha et al. | 713/300 |
| 8,171,315 B2 | 5/2012 | Karam et al. | |

* cited by examiner

*Primary Examiner* — Suresh Suryawanshi
(74) *Attorney, Agent, or Firm* — Duane S. Kobayashi

(57) ABSTRACT

A system and method for physical layer device enabled power over Ethernet (PoE) processing. A digital PoE control module is included within a physical layer device and is designed to complement an analog PoE control module within a power sourcing equipment. The inclusion of the digital PoE control within the physical layer device reduces the complexity of the power sourcing equipment without sacrificing PoE control features.

22 Claims, 3 Drawing Sheets

SYSTEM AND METHOD FOR PHYSICAL LAYER DEVICE ENABLED POWER OVER ETHERNET PROCESSING

This application is a continuation of non-provisional patent application Ser. No. 12/762,435, filed Apr. 19, 2010, which is incorporated by reference herein, in its entirety, for all purposes.

BACKGROUND

1. Field of the Invention

The present invention relates generally to power over Ethernet (PoE) and, more particularly, to a system and method for physical layer device enabled PoE processing.

2. Introduction

In a PoE application such as that described in the IEEE 802.3af (which has now part of the IEEE 802.3 revision and its amendments) and 802.3at specifications, a power sourcing equipment (PSE) can deliver power to a powered device (PD) over Ethernet cabling. Various types of PDs exist, including voice over IP (VoIP) phones, wireless LAN access points, Bluetooth access points, network cameras, computing devices, etc.

In accordance with IEEE 802.3af, a PSE can deliver up to 15.4 W of power to a single PD over two wire pairs. In accordance with IEEE 802.3at, on the other hand, a PSE may be able to deliver up to 30 W of power to a single PD over two wire pairs. Other proprietary solutions can potentially deliver higher or different levels of power to a PD. A PSE may also be configured to deliver power to a PD using four wire pairs.

In the PoE process, a valid device detection is first performed. This detection process identifies whether or not a PSE is connected to a valid PD to ensure that power is not applied to non-PoE capable devices. After a valid PD is discovered, the PSE can optionally perform a power classification. In a conventional 802.3af allocation, for example, each PD would initially be assigned a 15.4 W power classification after a Layer 1 discovery process is implemented.

After a valid PD is identified and possibly classified, power can be allocated to the port. In this allocation process, a determination can be made as to the amount of power that can be delivered to the PD relative to the amount of power available to the PSE. Typically, a PSE can distribute a fixed pool of power amongst a plurality of PDs that are each coupled to a network element such as a switch.

The allocation of power to a PD can be based on a power budget, which can identify the amount of power allocated to the port to which the PD is coupled. In one example, the power budget allocated to the port can also consider the power loss attributable to the cable. In one embodiment, the amount of power allocated to the port can be fixed or dynamic. In one example, dynamic budgeting of power to a PD can be based on current or anticipated changes in the power consumed by the PD.

Beyond the allocation of power budgets to the PD, further monitoring functions can be implemented to manage the PD. What is needed therefore is a mechanism that enables efficient control of the various PoE processes.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
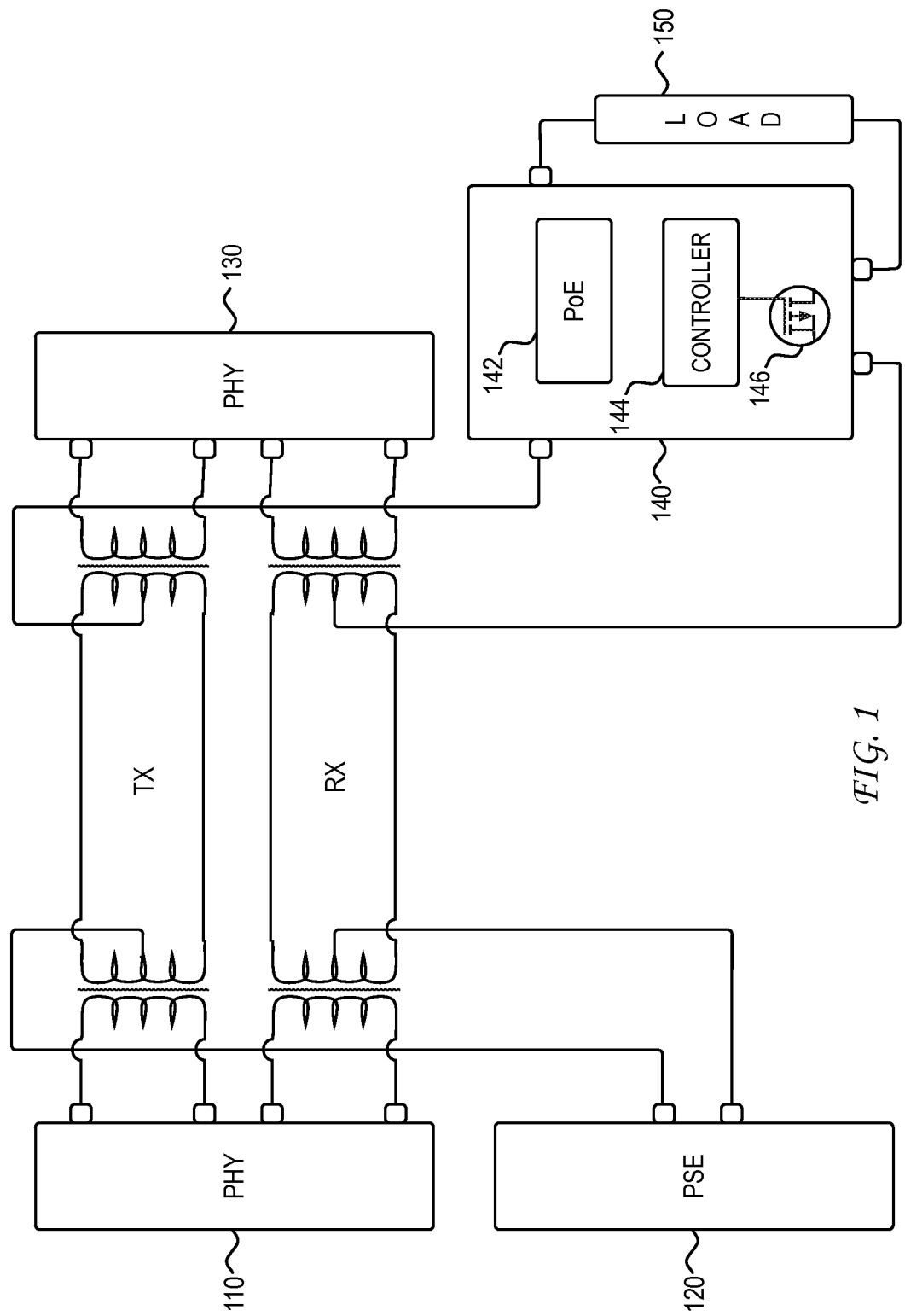
FIG. 1 illustrates an embodiment of a PoE system.

FIG. 1 illustrates an example of a PoE system. As illustrated, the PoE system includes PSE 120 that transmits power to PD 140 over two wire pairs. Power delivered by PSE 120 to PD 140 is provided through the application of a voltage across the center taps of a first transformer that is coupled to a transmit (TX) wire pair and a second transformer that is coupled to a receive (RX) wire pair carried within an Ethernet cable. In general, the TX/RX pairs can be found in, but not limited to structured cabling. The two TX and RX pairs enable data communication between Ethernet PHYs 110 and 130 in accordance with 10BASE-T, 100BASE-TX, 1000BASE-T, 10GBASE-T and/or any other PHY technology.

As is further illustrated in FIG. 1, PD 140 includes PoE module 142. PoE module 142 includes the electronics that would enable PD 140 to communicate with PSE 120 in accordance with a PoE specification such as IEEE 802.3af (PoE), 802.3at (PoE Plus), legacy PoE transmission, or any other type of PoE transmission. PD 140 also includes controller 144 (e.g., pulse width modulation (PWM) DC:DC controller) that controls power transistor (e.g., FET) 146, which in turn provides constant power to load 150.

In implementing the basic PoE system of FIG. 1, various PoE architectures can be used. In one example, the PSE is designed with low-cost analog hardware having a register map interface that facilitates network-based management. This architecture is optimized for low-cost, high-volume PoE production, where the analog hardware is designed to support basic analog functions such as detection, classification, soft start, FET control, disconnect, current/voltage/temperature monitoring, etc.

While the low-cost analog hardware PSE implementation provides production benefits, PoE control features are limited. For example, a PSE having low-cost analog hardware is not designed to implement power budgeting (e.g., power level thresholds), enhanced monitoring (e.g., power consumption measurements, PD policing, etc.), and feature rich software controls (e.g., port-specific configuration, dynamic power adjustments, etc.).

To facilitate these expanded PoE control features, another PoE architecture has the PoE subsystem incorporating a processor to implement the digital control functions that extend beyond the conventional analog control functions. In one embodiment, the processor is incorporated in the PSE. In another embodiment, the processor is incorporated in a separate PoE controller device that is shared by a plurality of PSEs. The variations in this type of PoE architecture are based on the tradeoffs in processing bandwidth, cost, and die considerations.

Die considerations are significant especially when considering the incorporation of the processor within the PSE. This results from the different requirements of the analog control functions as compared to the digital control functions, which necessitate a multi-die package or a larger die size. As would be appreciated, either of these manufacturing options would have a significant impact on PoE cost, and hence a significant impact on the competitiveness of the PoE product in the marketplace. Notwithstanding the increase in costs in manufacturing and implementation, the incorporation of processing capability in the PSE can be accepted in light of the corresponding increase in PoE service functionality.

Figure 2:
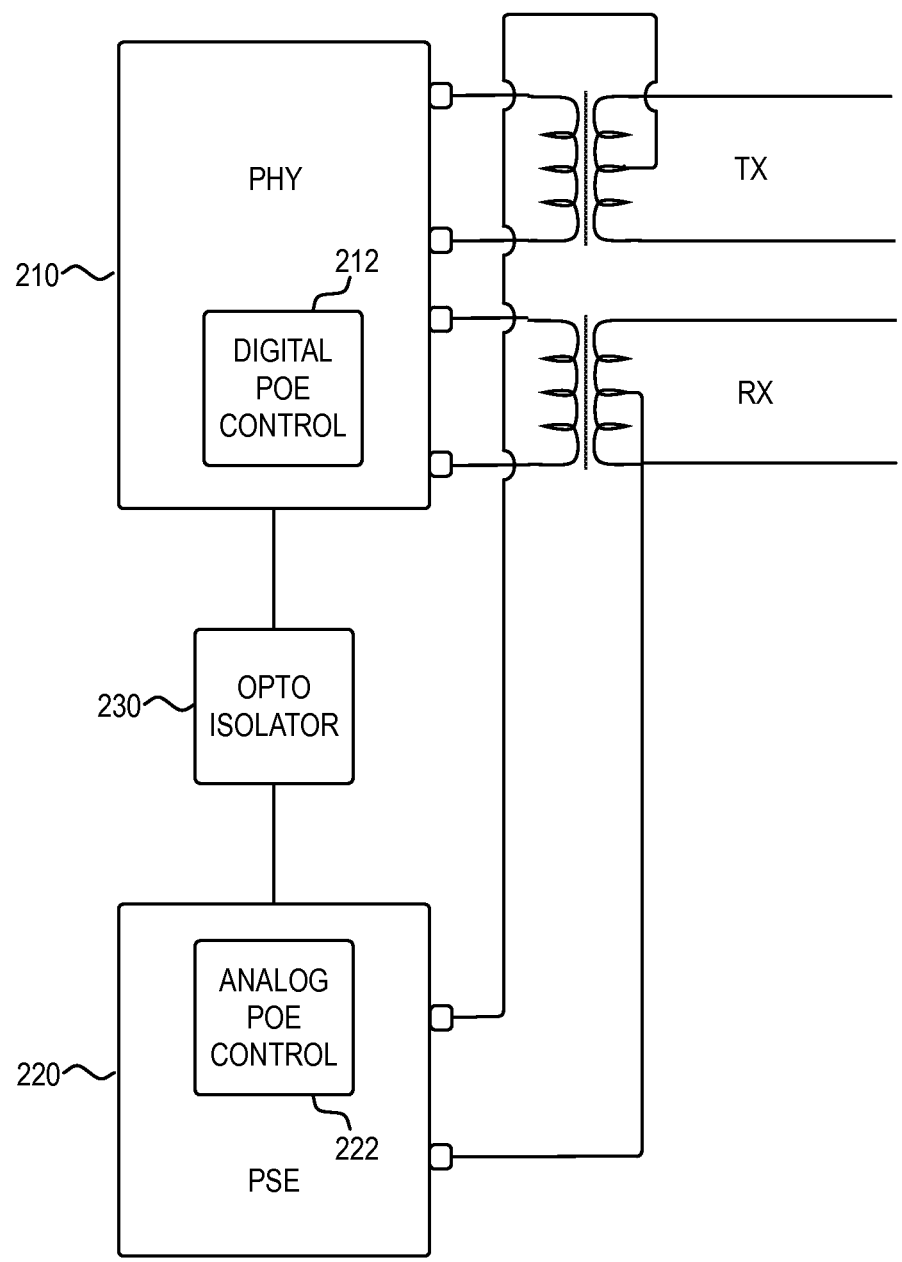
FIG. 2 illustrates an embodiment of physical layer device enabled PoE control.

In accordance with the present invention, PoE service functionality can be increased with a relatively small increase in manufacturing cost. FIG. 2 illustrates an embodiment of such a solution that provides PHY enabled PoE processing.

As illustrated in FIG. 2, PHY 210 is coupled to two transformers that are respectively coupled to two wire pairs. Specifically, a first transformer is coupled to a transmit (TX) wire pair and a second transformer is coupled to a receive (RX) wire pair carried within an Ethernet cable. The two TX and RX wire pairs enable data communication by PHY 210 with a PHY in a peer device. As illustrated, PSE 220 transmits power to a PD over the same two wire pairs through the application of a voltage across the center taps of the two transformers.

PSE 220 includes analog PoE control 222, which is a module designed to support the analog functions of the PSE. As noted above, these conventional analog functions include detection, classification, soft start, FET control, disconnect, current/voltage/temperature monitoring, etc. Unlike other conventional architectures, the digital process control has been removed from PSE 220 and implemented in PHY 210 as digital PoE control 212. As noted above, the digital process control can implement power budgeting, enhanced monitoring, and other feature rich software controls. This list of controls are not intended to limiting as they can extend into other areas. For example, the digital process control can be used to run a state machine that controls the PoE discovery and/or disconnect process.

The inclusion of digital PoE control 212 into PHY 210 comes with minimal impact to PHY 212. First, many modern PHYs already incorporate some form of processing capability, which capability can be used, for example, in cable diagnostics, line equalization, energy efficient Ethernet control policy, etc. As compared to current processing needs of a conventional PHY (e.g., 10GBASE-T), the processing needs of digital PoE control 212 is relatively small. Incorporation of the digital logic within PHY 210 to support the digital PoE control features therefore comes with relatively small increase in the number of gates required in the die package. Moreover, as the digital PoE control 212 would not represent a need for mixed signal processing within PHY 210, digital PoE control 212 can be simply added onto a single die.

As illustrated in FIG. 2, the mixed processing between digital PoE control 212 in PHY 210 and the analog PoE control 222 in PSE 220 would be facilitated by opto-isolator 230, which facilitates communication between PHY 210 and PSE 220 through an isolation boundary. This feature of the present invention would obviate the need for a multi-die package or larger die within PSE 220. As would be appreciated, isolation techniques other than an opto-isolator can be used to produce an isolation boundary.

It should also be noted that some application environments need not require the use of an isolation boundary. Examples of such an application environment are cases where the entire system is floating (e.g., a plastic VoIP phone), PHY enhancements exist, the PHY and PoE embodied in a multi chip module (MCM), and an analog PHY and PoE are on the same die.

Figure 3:
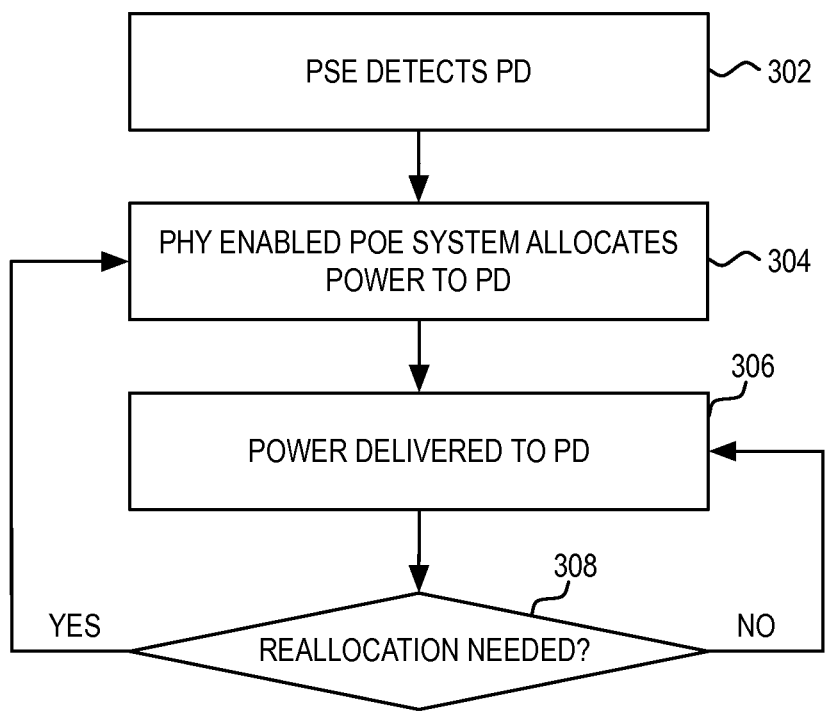
FIG. 3 illustrates a flowchart of a process of the present invention.

Having described an example embodiment of a PHY enabled PoE processing system, reference is now made to FIG. 3, which illustrates an example method for using the PHY enabled PoE processing system. In the following description, it should be noted the specific interplay between analog PoE control 222 and digital PoE control 212 would be implementation dependent and that the example is not intended to be limiting on the scope of the present invention. Moreover, the flowchart of FIG. 3 is only one example application of how the PHY enabled PoE processing system can be used. Other applications of the control enabled by such a PHY enabled PoE processing system would be evident to one of ordinary skill in the relevant art.

As illustrated, the process begins at step 302 where the PSE detects the signature resistance of the PD. This detection process can be performed under the control of the analog PoE control within the PSE. The optional classification process of the PD can also be performed under the control of the analog PoE control within the PSE.

At step 304, the PHY enabled PoE system allocates power to the PD. In this process, the digital PoE control within the PHY can determine a power budget applicable to the PD. In one example, this power budget can be based on a power classification of the PD in additional to power loss estimates for the cabling. As would be appreciated, the power loss estimates for the cabling can be determined using cable measurements by the PHY that enable a determination of cable length, type, resistance, temperature, etc. As the digital PoE control is contained within the PHY, the digital PoE control can easily leverage cabling measurements (e.g., TDR, insertion loss, cross talk, etc.) taken by the PHY for data transmission configuration.

Next, at step 306, a determined amount of power is delivered to the PD. In one example, power budget information determined by the digital PoE control in the PHY can be used to generate a current limit that can be used by the analog PoE control in the PSE that controls the actual delivery of power to the PD. As would be appreciated, various forms of interaction between the digital PoE control in the PHY and the analog PoE control in the PSE can be used to effect a power allocation or other control on a functional aspect of the delivery of power to the PD.

After power is delivered to the PD at step 306, it is then determined at step 308 whether a reallocation of power is needed for that PD. In one embodiment, this process can represent a dynamic control that can alter the amount of power delivered to the PD based on factors such as actual usage, scheduling, anticipated needs, etc. In this process, the digital PoE control can be used to monitor and effect a feature rich control mechanism that can modify the allocation of power to the PD. If a reallocation is needed, then the reallocation can be effected at step 304, whereas if a reallocation is not needed, then power can continue to be delivered to the PD at step 306.

In the above example, an example application of a PHY enabled PoE processing system has been provided. This example is not intended to be limiting on the potential features of either the digital PoE control, analog PoE control, or the interplay between them. One of the aspects of significance of the present invention is that complex controls can be implemented in the PoE system by leveraging the processing capabilities of the PHY, instead of incorporating such complex control mechanisms within the PoE subsystem. Such a feature reduces the complexity of the PoE subsystem complexity without sacrificing any of the application features that can be provided by the PoE subsystem.

As would be appreciated, the principles of the present invention can be applied to various two-pair and four-pair PoE applications, or to various PHY data transmission systems. In one embodiment, the principles of the present invention can be applied to midspans with PHY intelligence.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A system, comprising:
    a power sourcing equipment coupled to a transformer, said power sourcing equipment being configured to deliver power to a powered device using a wire pair that is coupled to said transformer, said power sourcing equipment including an analog controller module, said analog controller module including first logic that is configured to control a monitoring of current and voltage levels associated with said delivery of power to said powered device; and
    a physical layer device coupled to said power sourcing equipment, said physical layer device also coupled to said transformer for the transmission of data over said wire pair, said physical layer device including a digital controller module, said digital controller module including second logic that is configured to control an allocation of power delivered by said power sourcing equipment to said powered device over said wire pair.

2. The system of claim 1, wherein said analog controller module further includes logic that is configured to control a detection and classification of said powered device.

3. The system of claim 1, wherein said analog controller module further includes logic that is configured to control a disconnection of said powered device.

4. The system of claim 1, wherein said digital controller module further includes logic that is configured to control a power budget for said powered device.

5. The system of claim 1, wherein said physical layer device is coupled to said power sourcing equipment via an isolation boundary.

6. The system of claim 5, wherein said an opto-isolator.

7. A system, comprising:
    a power sourcing equipment coupled to a transformer that is coupled to a wire pair, said power sourcing equipment being configured to deliver power to a powered device using said wire pair; and
    a physical layer device coupled to said transformer for the transmission of data, said physical layer device including a controller module that includes logic that is configured to control a delivery of power by said power sourcing equipment to said powered device.

8. The system of claim 7, wherein said power sourcing equipment includes an analog controller module.

9. The system of claim 8, wherein said analog controller module is configured to control a detection of said powered device.

10. The system of claim 8, wherein said analog controller module is configured to control a classification of said powered device.

11. The system of claim 8, wherein said analog controller module is configured to control a disconnection of said powered device.

12. The system of claim 8, wherein said analog controller module is configured to control a monitoring of one or more of current, voltage or temperature.

13. The system of claim 7, wherein said logic is configured to control a power budget for said powered device.

14. The system of claim 7, wherein the system is a midspan power over Ethernet system.

15. A method, comprising:
    detecting a powered device using a first controller contained within a power sourcing equipment, said power sourcing equipment coupled to a transformer that is coupled to a wire pair; and
    controlling a power budget for power delivered to said powered device using a second controller contained within a physical layer device, said physical layer device being coupled to said transformer for the transmission of data.

16. The method of claim 15, further comprising monitoring, by said first controller, one or more of current, voltage or temperature associated with said power delivered to said powered device.

17. The method of claim 15, further comprising communicating between said power sourcing equipment and said physical layer device through an isolation boundary.

18. A physical layer device, comprising:
    a first controller portion that is configured to control a transmission of data by said physical layer device over a wire pair, the physical layer device being coupled to said wire pair via a transformer; and
    a second controller portion that is configured to control a delivery of power by a power sourcing equipment to a powered device coupled to said wire pair, said power sourcing equipment being coupled to said wire pair via said transformer.

19. The device of claim 18, wherein said second controller portion is configured to control a budgeting of power delivered by said power sourcing equipment to said powered device.

20. The device of claim 18, wherein said second controller portion is configured to communicate with said power sourcing equipment via an isolation boundary.

21. The device of claim 20, wherein said isolation boundary is produced by an opto-isolator.

22. The method of claim 17, wherein said isolation boundary is produced by an opto-isolator.

* * * * *